Dec. 27, 1955                R. G. TARR                2,728,306
METHOD FOR DISPENSING FROZEN CONFECTIONS
AND APPARATUS FOR USE IN SAME
Filed March 12, 1949                              8 Sheets-Sheet 1
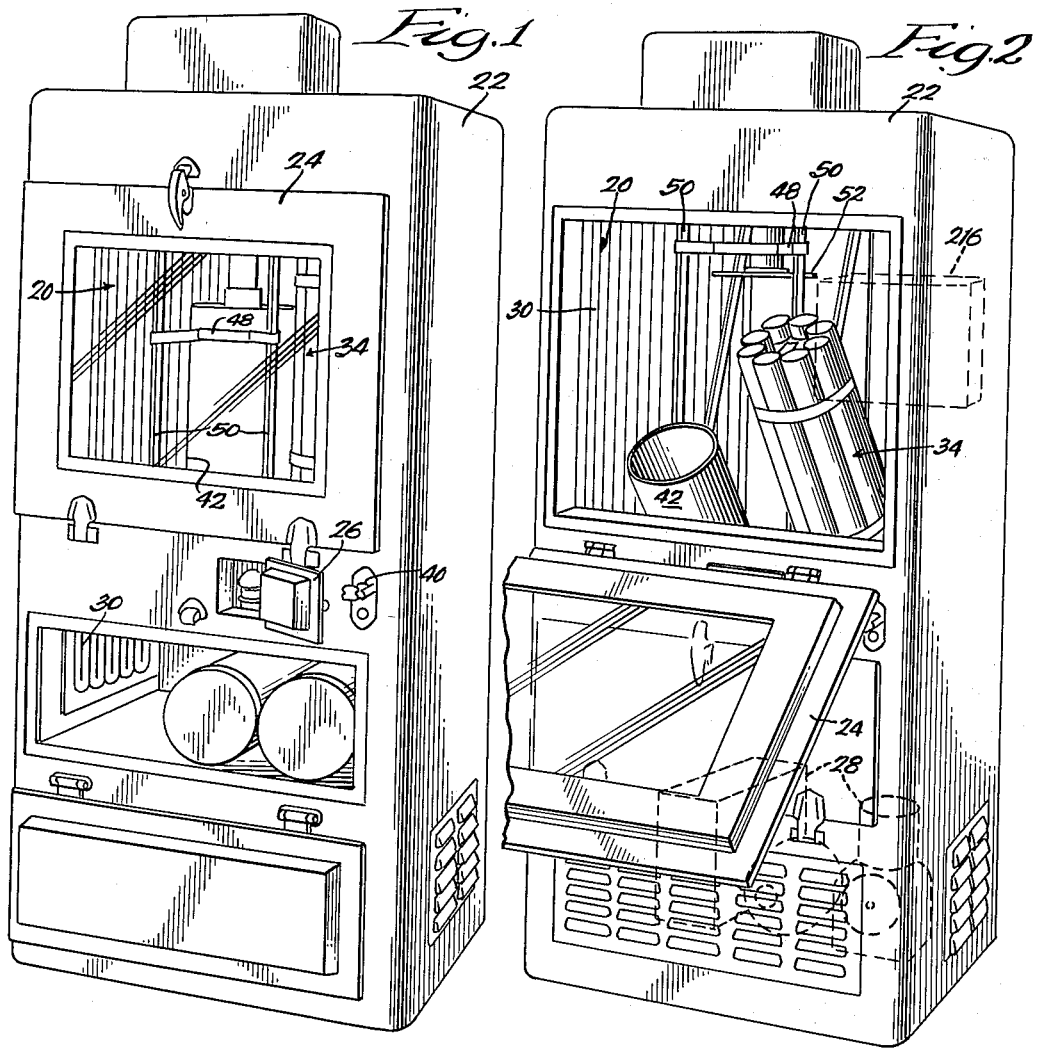
INVENTOR.
Robert G. Tarr,
BY Dawson, Ooms, Booth and Spangenberg,
ATTORNEYS.

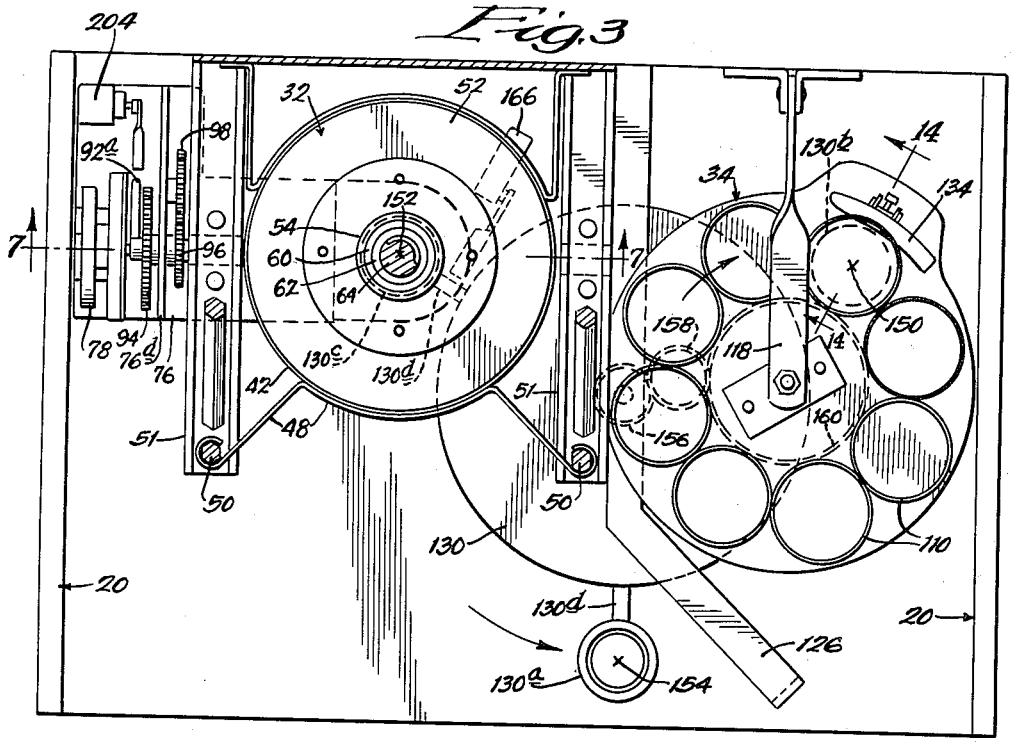
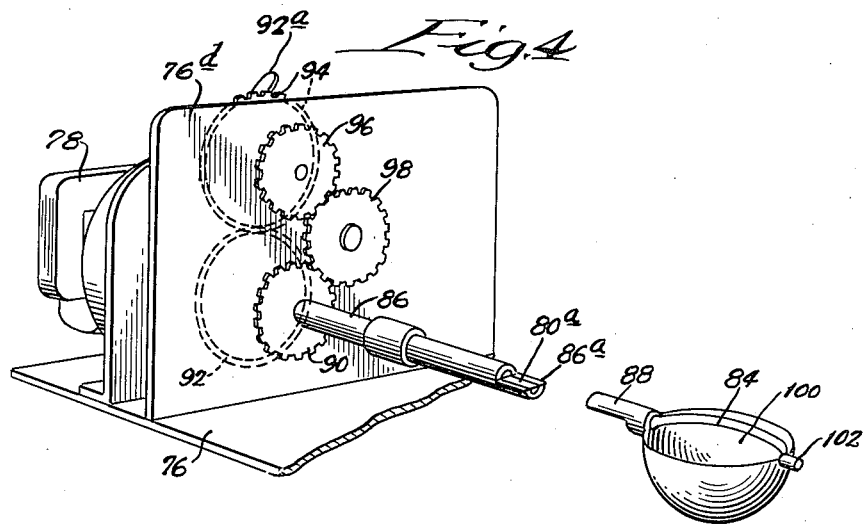

INVENTOR:
Robert G. Tarr,
BY Dawson, Ooms, Booth and Spangenberg,
ATTORNEYS.

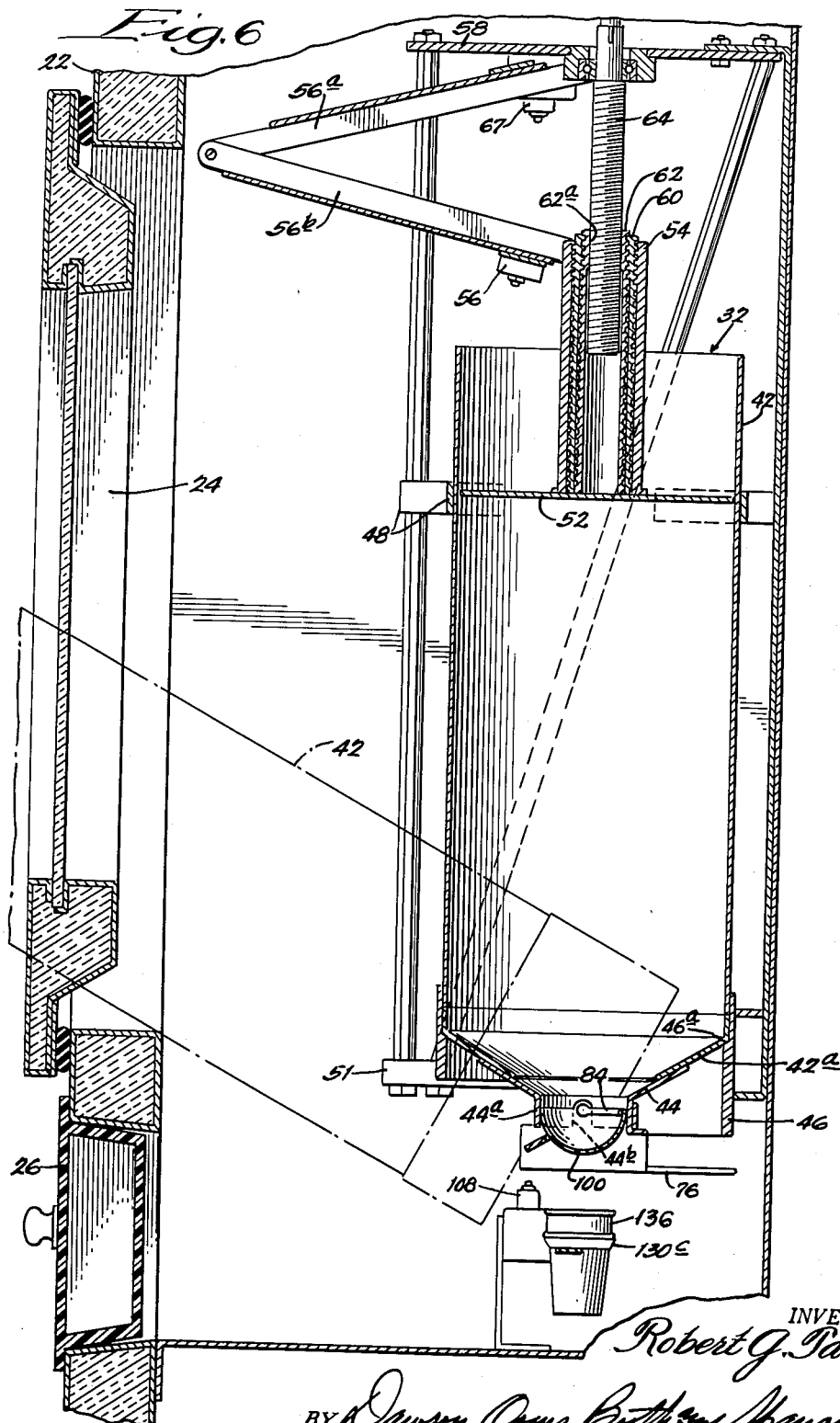

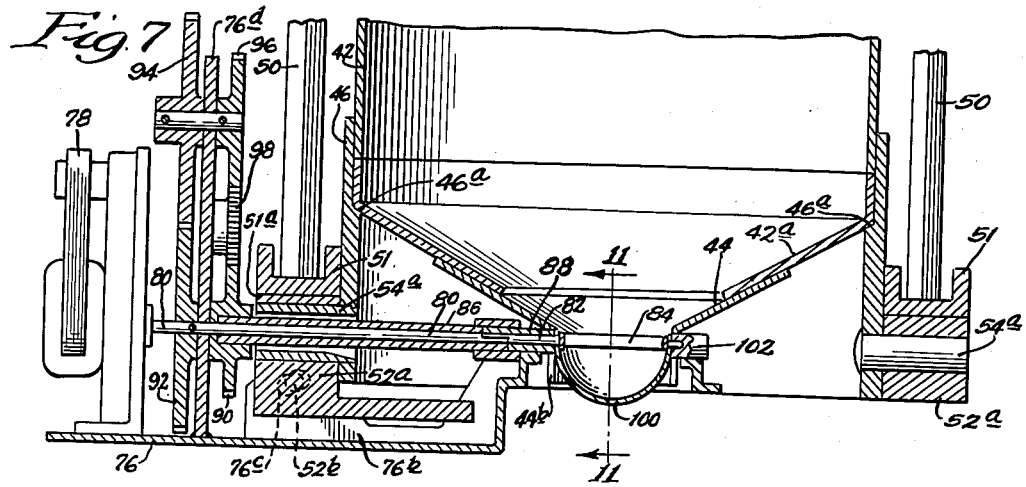

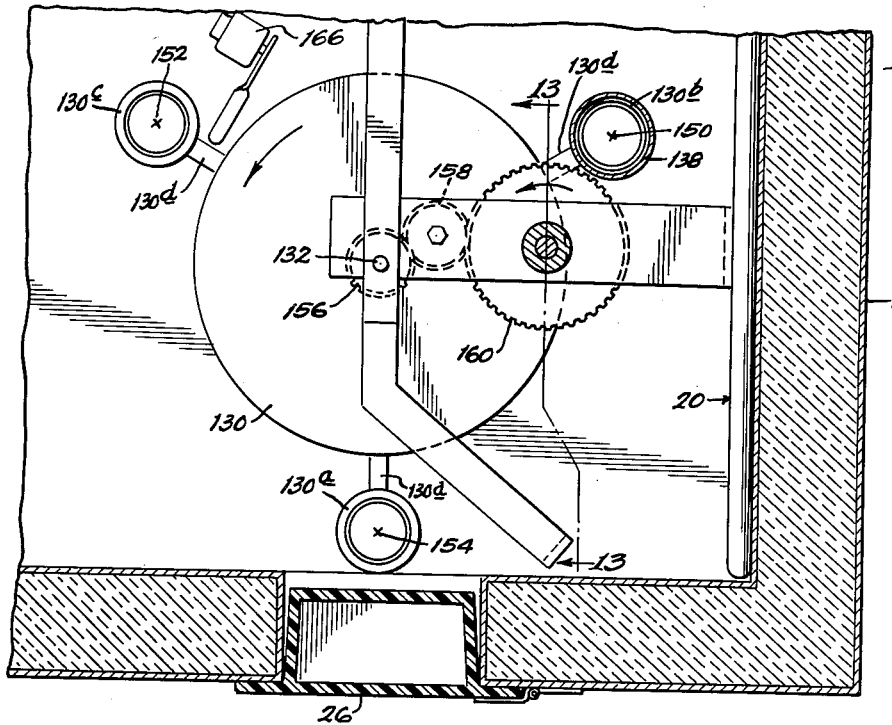
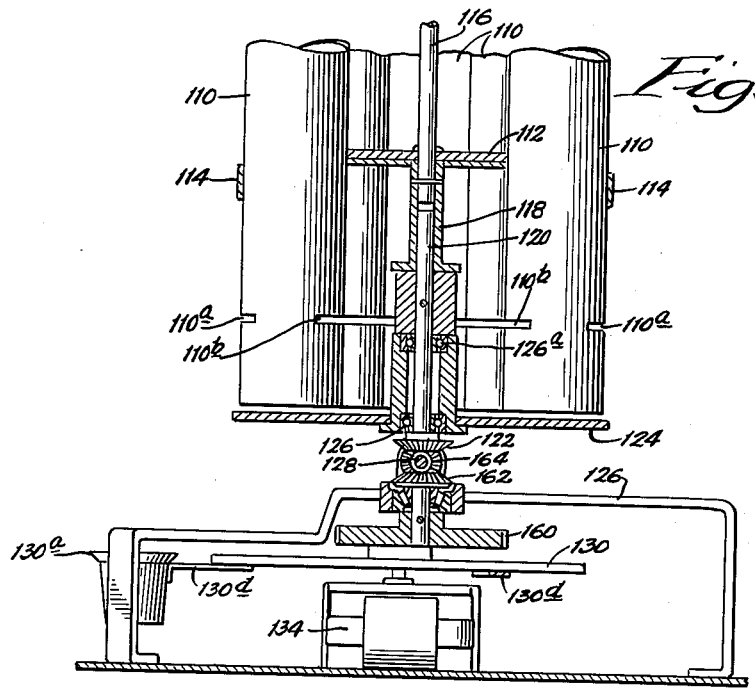

Dec. 27, 1955
R. G. TARR
2,728,306
METHOD FOR DISPENSING FROZEN CONFECTIONS
AND APPARATUS FOR USE IN SAME
Filed March 12, 1949
8 Sheets-Sheet 7
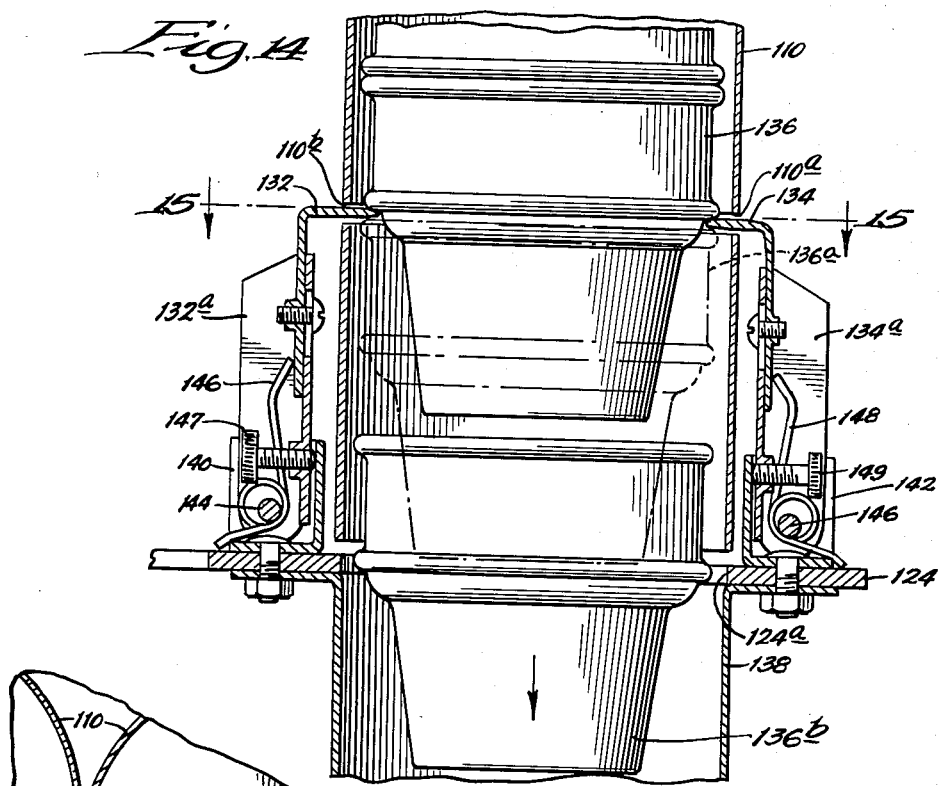
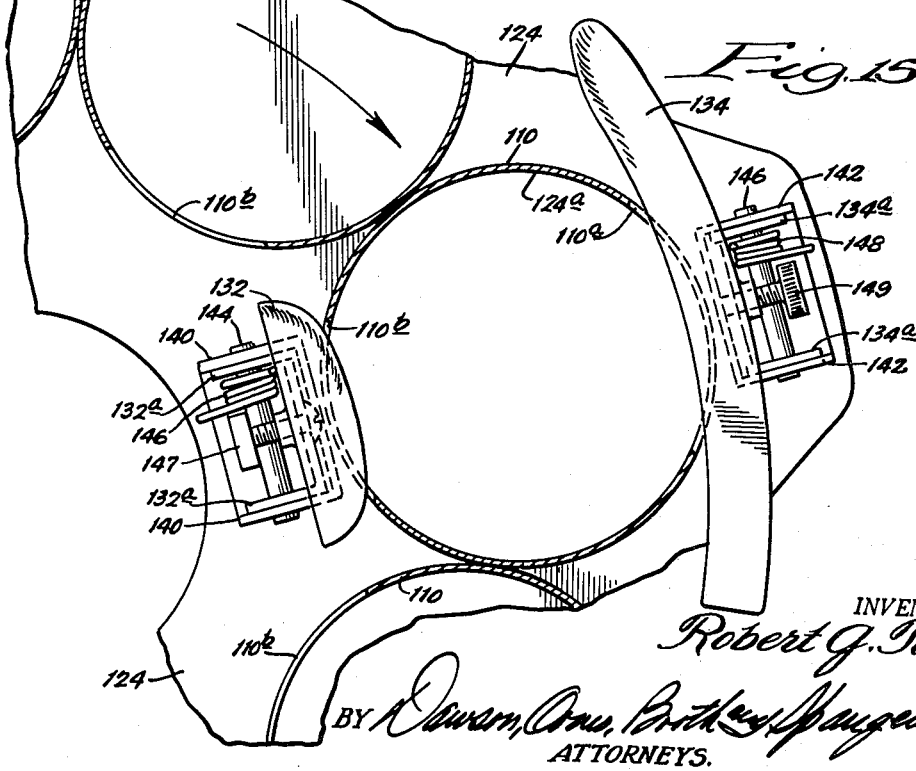
INVENTOR:
Robert G. Tarr.
BY Dawson, Ones, Brothers Spangenberg,
ATTORNEYS.

Dec. 27, 1955     R. G. TARR     2,728,306
METHOD FOR DISPENSING FROZEN CONFECTIONS
AND APPARATUS FOR USE IN SAME
Filed March 12, 1949     8 Sheets-Sheet 8
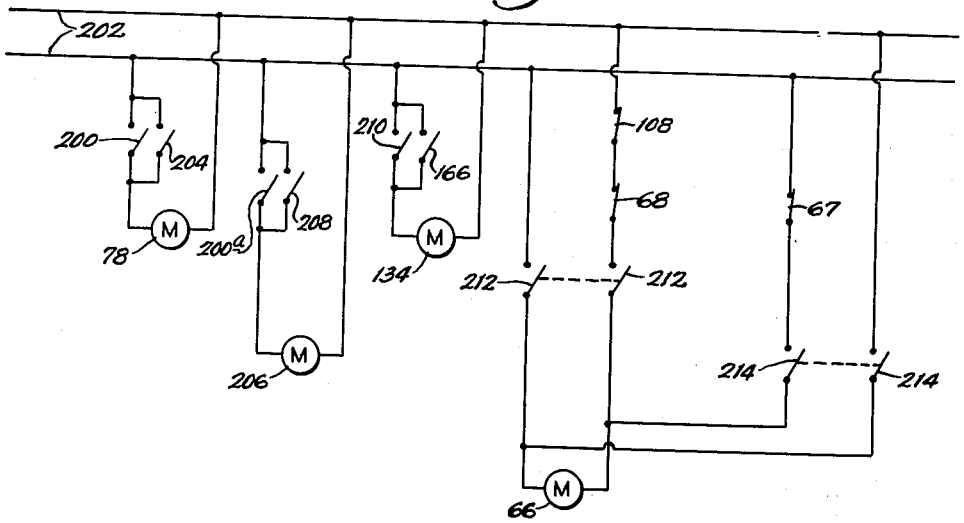
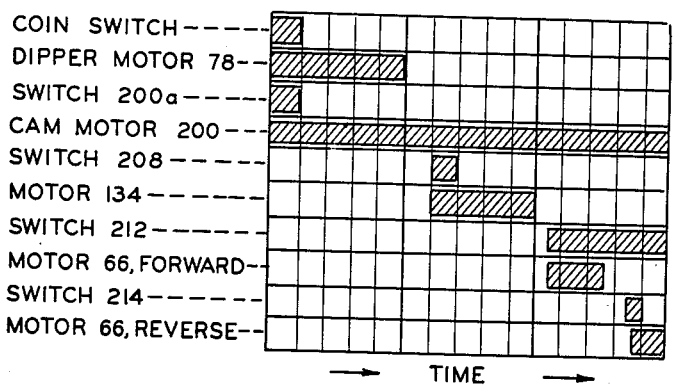
INVENTOR:
Robert G. Tarr,
BY Dawson, Ooms, Birth and Spangenberg,
ATTORNEYS.

United States Patent Office 2,728,306
Patented Dec. 27, 1955

2,728,306

METHOD FOR DISPENSING FROZEN CONFECTIONS AND APPARATUS FOR USE IN SAME

Robert G. Tarr, Villa Park, Ill.

Application March 12, 1949, Serial No. 81,120

6 Claims. (Cl. 107—8)

My invention relates to an improved ice cream cone dispenser adapted to make ice cream cones and deliver the same to a predetermined point of delivery.

In accordance with the present invention a cone-receiving carriage is rotated to receive cones and carry the same in succession to an ice cream dispensing station and to the ice cream cone dispensing point. When the mechanism is actuated by deposit of a coin or similar preselected act, elements in the machine operate to form a new ice cream cone and deliver the same to the dispensing point. Thereafter, other elements operate to place the apparatus in an ice cream cone forming condition preparatory to the next actuation of the mechanism.

It is therefore a general object of the present invention to provide an improved apparatus to form ice cream cones and deliver the same to a predetermined dispensing point.

A more specific object of the present invention is to provide an ice cream cone dispenser having means to store and utilize a large number of cones.

Another object of the present invention is to provide automatic means to dispense or deliver cones singly to a rotatable carriage in response to the rotations thereof.

Another object of the present invention is to provide improved means to form balls of ice cream or like plastic material.

Still another object of the present invention is to provide a sanitary mechanism to receive ice cream and form balls therefrom.

It is yet another object of the present invention to provide ice cream ball forming elements capable of responding by rocking and shifting movements to pressure exerted on the ice cream.

Yet another object of the present invention is to provide an ice cream cone forming machine wherein deposit of a coin or like event initiates prompt dispensing operations and, in addition, prepares the mechanism for a later cycle of operation.

Still another object of the present invention is to provide an ice cream cone making machine that is sanitary and readily cleaned.

The novel features which I believe to be characteristic of my invention are set forth with particularity in the appended claims. My invention itself, however, both as to its organization and mode of operation will best be understood by reference to the following description taken in connection with the accompanying drawings in which:

Figure 1 is a perspective view of a machine constructed in accord with the principles of the present invention;

Figure 2 is an enlarged view like Figure 1 but showing the machine with the reloading door opened;

Figure 3 is a top plan view of the operating elements of the machine of Figure 1 with parts in cross section;

Figure 4 is a view in perspective of the ball forming cup mechanism and the carriage upon which it is mounted;

Figure 6 is a cross sectional view through the axis 6—6, Figure 5;

Figure 7 is a fragmentary cross sectional view through axis 7—7, Figure 3, and showing the mechanism in the relaxed or unloaded condition;

Figure 8 is a view like Figure 7 but showing the mechanism in the tilted condition under pressure from the ice cream;

Figure 9 is a cross sectional view through axis 9—9, Figure 8;

Figure 10 is a view like Figure 9 but showing the cup and knife in intermediate positions as a ball of ice cream is formed;

Figure 11 is a cross sectional view through axis 11—11, Figure 7;

Figure 12 is a fragmentary cross sectional view through axis 12—12, Figure 5;

Figure 13 is a cross sectional view through axis 13—13, Figure 12;

Figure 14 is an enlarged fragmentary view through axis 14—14, Figure 3;

Figure 15 is a cross sectional view through axis 15—15, Figure 14;

Figure 16 is a circuit diagram of the mechanism of Figure 1, and;

Figure 17 is a time chart illustrating a cycle of operation of the mechanism.

Figure 5:
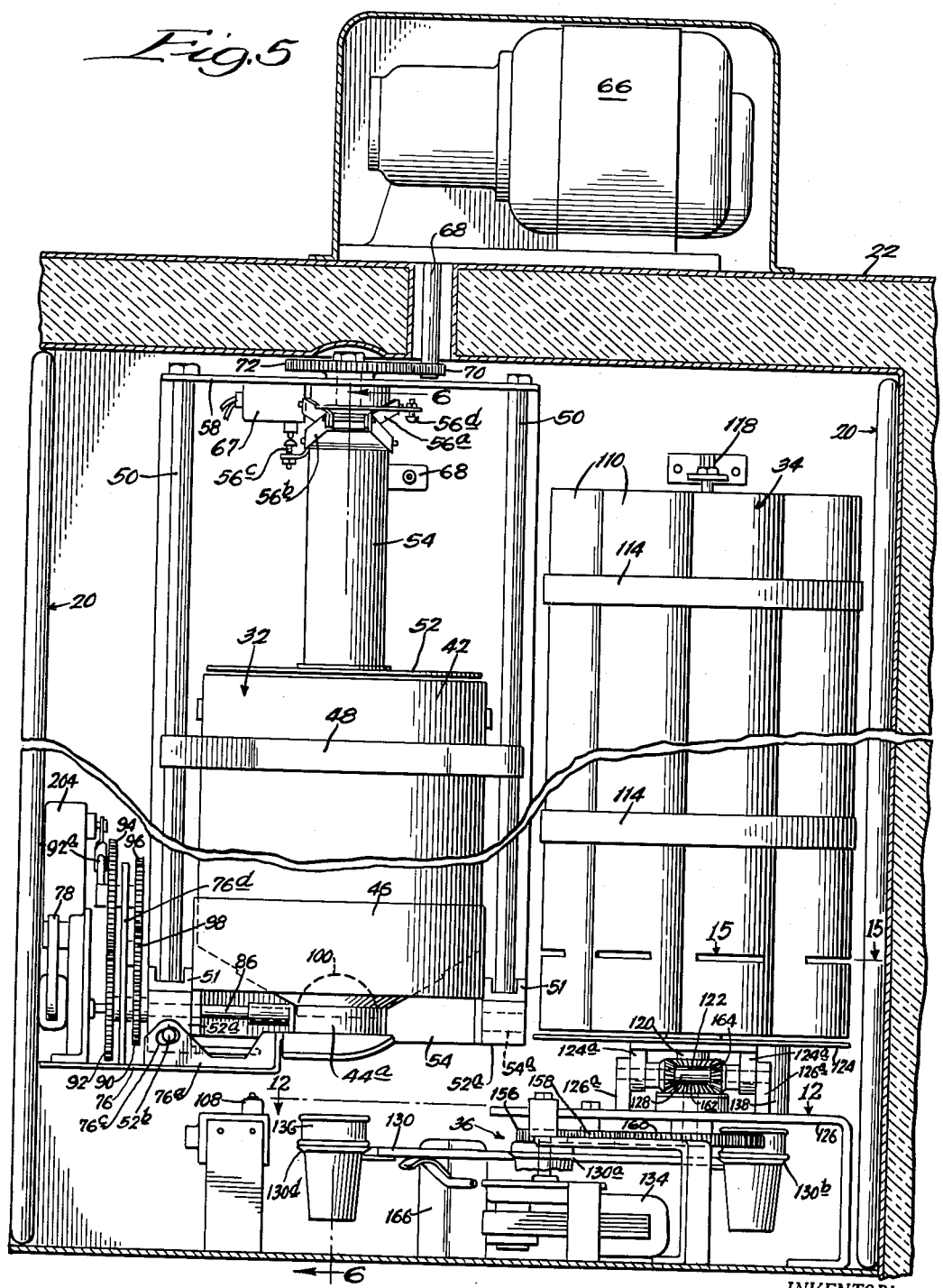
Figure 5 is a side elevational view of the operating elements of the machine of Figure 1 with parts in cross section.

As shown in Figures 1 and 2, the cone making machine of the present invention is mounted in the refrigerated space 20 of the cabinet 22. A reloading door 24 is swingably mounted in front of space 20 to provide access for adding ice cream and cones and for cleaning the mechanism. The access door 26 enables the user of the machine to reach a formed ice cream cone in the cone delivery position.

If desired, suitable blocking elements (not shown) may be provided to obstruct access to parts of the mechanism other than the ice cream cone delivery or dispensing point when access door 26 is open.

The refrigerated space 20 is maintained in a cool condition by the refrigerating mechanism 28 shown in phantom in Figure 2. This mechanism drives cooled refrigerant through the heat transfer plates 30.

The operating mechanism of the present invention may be seen best in Figure 5. It includes an ice cream storage unit, shown generally at 32, a cone storage unit, shown generally at 34; a transfer mechanism to transport the cones and completed ice cream cones, shown generally at 36; and a cup or dipper mechanism to form balls of ice cream, shown generally at 38.

When the unit is actuated by inserting a coin in the coin switch 40, Figure 1, the cup mechanism 38 is actuated and cuts a ball of ice cream which drops to the cone 136 disposed therebelow, thus forming a complete ice cream cone. The mechanism 36 then delivers the cone to the cone delivery point where the user can remove it from the machine by opening access door 26.

The ice cream storage mechanism

The ice cream storage mechanism 32 is defined by a tubular casing 42, Figure 5, which receives a tubular carton of ice cream. As seen best in Figure 6, the casing 42 is open at its top and at its bottom terminates in a conical chute 42a. A conical member 44 is affixed to chute 42a and is in mating relationship therewith. This member terminates in a cylindrical portion 44a.

The cylindrical portion 44a of member 44 has a pair of slots 44b, Figure 6, and Figure 9 which receive the shaft portion of the cup mechanism indicated generally at 38, Figure 5.

The casing 42 is received on the annular wall defined by strap 46, Figures 5 and 6. This wall is indicated at 46a, Figure 6. The casing is held in a vertical position by the saddle 48 which fits snugly against casing 42 and is slidably supported by vertical rods 50 as shown in Figures 1, 5 and 6. These rods also sustain frame 52, Figures 5 and 6.

The frame 52 defines a pair of diametrically opposed trunnion bearings 52a, Figure 5. Each of these bearings receives a trunnion axle 54a formed unitarily with the sub-frame 54 which supports the strap 46 and sustains the casing 42. The construction of the trunnion bearings and axles is shown in detail in the enlarged cross-sectional views of Figures 7 and 8.

When it is desired to clean casing 42 or to insert ice cream therein, the strap 48 is raised upwardly to clear the casing 42 as shown in Figure 2. Casing 42 may then be tilted forwardly as shown in Figure 2 to expose the interior thereof. The casing 42 may then be cleaned or a container of ice cream added.

The dotted lines of Figure 6 show the casing 42 in the tilted or ice cream receiving position.

Ice cream ejecting mechanism

Ice cream is forced downwardly through the tubular bottom portion of member 44 by the plunger 52. This plunger has a flat disk adapted to fit in the casing 42 and is carried by the inwardly threaded tube 54, Figure 6. The tube 54 is held against rotation by the toggle links 56a and 56b which are pivotally attached to the top plate 58 and the tube 54 respectively.

The internally and externally threaded intermediate tube 60 is threadedly received in the tube 54. The internal threads of tube 60 in turn receive the externally threaded tube 62. Tube 62 has an upper internally threaded portion 62a which receives the threaded shaft 64.

The shaft 64 is rotated by motor 66, Figure 5, by the linkage that may be traced from motor 66 to shaft 68, gears 70 and 72 and to the shaft 64, to which gear 72 is affixed.

As motor 66 is energized to drive shaft 64 in one direction or the other, the tubes 62, 60 and 54 are shifted to retracted or extended positions relative to each other depending on the direction of rotation. Stop elements (not shown) are provided to limit the movement of each tube relative to its associated tubes so that rotation of shaft 64 moves the plate 52 from the upper or retracted position shown in Figure 2 to a lower or extended position where it is adjacent the conical bottom 42a of the casing 42.

When the plate 52 is at the limit of its upward travel, the switch 67 is engaged by the arm 56c on toggle link 56b and is thereby actuated to stop the motor 66 as shown in Figure 5. When plate 52 reaches the downward limit of its travel the switch 68, Figure 5, is engaged by the arm 56d on the toggle link 56a to stop motor 66. The electrical circuits for this purpose are described in further detail hereafter.

Ice cream ball forming mechanism

The mechanism shown generally at 38, Figure 5, forms the ice cream into ice cream balls and drops the same on the cone below to form a complete ice cream cone. This mechanism comprises a tiltable and shiftable carriage 76 having a pair of side flanges 76a (Figure 5) and 76b (Figure 7). These flanges have aligned elongated openings 76c which form trunnion bearings in which the trunnion axles 52b fit as shown in Figures 5 and 7. These axles are carried by frame 52.

As seen best in the enlarged view of Figure 7, the carriage 76 has an upstanding wall 76d. The rear end of this carriage supports electric motor 78 to which shaft 80 is affixed. This shaft has a scarfed end portion 80a which receives the mating scarfed end of shaft 82, Figure 8. The latter shaft is formed unitarily with the arcuate knife 84.

The arcuate knife 84 defines a semicircle as shown in Figure 4.

The shafts 80 and 82 are received in hollow shafts 86 and 88, respectively. Shaft 86 terminates at its rear end in the gear 90 which is driven from motor 78 by the gear train 92, 94, 96, 98 as seen best in Figure 4. At its opposite end shaft 86 is scarfed as at 86a and mates with the scarfed end of shaft 88.

Shaft 88 is formed unitarily with the hemispherical cup 100 as seen best in Figure 4. The cup 100 has an outboard bearing 102 to receive the knife 84.

Since shaft 86 is driven by an odd number of gears from motor 78, the cup 100 is rotated in direction opposite to knife 84 as the motor 78 rotates. In the normal or unenergized condition of motor 78, the cup 100 and the knife 84 assume the aligned positions of Figure 4 where the knife is adjacent the edge of the cup. When motor 78 rotates one revolution, the knife rotates in one direction and the cup in the opposite direction as shown by arrows 104 and 106, Figure 9, respectively. They accordingly travel through the intermediate positions of Figure 10 and return to the original relative positions shown in Figure 11.

The foregoing action of knife 84 and cup 100 causes each portion of the ice cream ball to be traversed both by the knife and by the cup. As a consequence, the ice cream ball does not tend to stick to the cup 100 and falls out when that cup assumes the inverted position.

Operation of the ball forming mechanism is as follows:

1. When ice cream is introduced into casing 42, and the machine is energized, the motor 66 rotates to cause the plunger 52 to descend. This forces ice cream from the casing 42 into the cup 100. The ice cream body then forms a shape having a hemispherical bottom configuration conforming to the shape of cup or dipper 100.

2. As ice cream passes into cup or dipper 100, downward force is exerted thereon, thus tilting and shifting carriage 76 to the position shown in Figure 8. At the limit of this tilt, the switch 108 is engaged by the carriage 76 to discontinue forward rotation of motor 66 and cause that motor to rotate in the reverse direction for a limited time.

3. The foregoing operations form an ice cream body with a hemispherical bottom.

4. When motor 78 is energized, the upper half of the ice cream ball is cut out and the ice cream ball drops to the cone 136, Figure 5.

5. Upon releasing the ball, the carriage 76 tilts upwardly to free switch 108 to permit operation of motor 66 and enable plunger 52 to descend, thus forming the ice cream for a new cycle of operation.

The trunnion shaft 54a, Figure 8, adjacent the shaft 86 is made hollow to receive that shaft and permit full tilting movements of carriage 76. Since the axis of tilt of casing 42 is coincident with the axis of shaft 86, the casing may be tilted without interference from the shaft.

The cone storage mechanism

The cone storage mechanism 34 is defined by eight cone-receiving tubes 110, Figures 3 and 5. These are held in place against spiders 112, Figure 13, by the straps 114, Figure 5, each spider 112 being located in alignment with the corresponding strap 114 as shown in Figure 13. The spiders 112 are carried by the vertical shaft 116, Figure 13, the latter being held at its upper end by bracket 118, Figure 5, affixed to the rear wall of the refrigerated space.

The shaft 116, Figure 13, is received in sleeve 118 which in turn receives shaft 120. The latter shaft receives bevel gear 122 at its lower end. It is supported from stationary plate 124 by the spaced ball bearings 126 and 126a.

The stationary plate 124 is pivotally supported by the support strap 126, Figure 5. This is accomplished by the brackets 126a on strap 126 and the downwardly extending brackets 124a of plate 124. These brackets have aligned openings to receive the shaft 128.

The cone dispensing mechanism

It is the purpose of the cone dispensing mechanism to deposit cones from tubes 110 in sequence onto a cone receptacle portion of carriage 130. To this end, each tube 110 has a pair of diametrically opposed slots 110a and 110b, Figure 13. These slots are aligned relative to each other to define spaces to receive the cams 132 and 134, Figure 14.

The cams 132 and 134 are located relative to plate 124 to ride above the lip of the lowermost cone in the stack. That is, as the stacks of cones are bodily moved by movements of tubes 110, the bottom cone of each stack slides on plate 124 and the cams 132 and 134 are just above the upper edge or lip of that cone. This is seen best in the view of Figure 14 where the position of the lowermost cone 136a is shown by dotted lines with the cones above it shown solid.

The plate 124 has an opening 124a substantially in registry with the point cones are desired to be delivered and in registry with the tubes 114 as the tube assembly is bodily rotated about the axis of shaft 116.

When each tube 114 travels across the opening 124a, the cams 132 and 134 ride into slots 110b and 110a, respectively. When the tube is directly over the opening 124a, the lowermost cone drops through the opening, as shown at 136b, Figure 14. However, the upper cones 136 are prevented from dropping out by the cams 132 and 134.

It is the purpose of tube 138, Figure 14, to guide the cones from the opening 124a to the point where the cones are desired to be deposited. This tube may be tilted as required.

As shown in Figures 14 and 15, the cams 132 and 134 are pivotally mounted on stirrups 140 and 142, respectively. Cam 132 has a pair of ears 132a which mate with the corresponding ears of stirrup 140. Aligned openings in the ears 132a and stirrup 140 receive shaft 144. The cam is biased into the slots 110b by the spring 146.

The cam 134 has ears 134a with openings aligned with openings in stirrup 142. Shaft 146 is received in these openings. The spring 148 biases the cam 134 into the slot 110a.

The cone transport mechanism

As seen best in Figure 3, the cones are transported between three stations spaced 120° relative to each other in a circle. The first point or station is the cone dispensing point or station 150, Figure 3. It is at this point that the cones are dropped downwardly to carriage 130 and are deposited thereon. The second point is the cone loading point or station 152 where the ball of ice cream is dropped on each cone. The third point is the ice cream cone dispensing point or station 154 where the complete ice cream cone may be removed through access door 26.

The carriage 130 has three annular cone-receiving members 130a, 130b, and 130c, Figure 12, located at 120° spacings relative to each other. Each of these members is carried on an arm 130d extending from the circular center section of carriage 130.

The carriage 130 is mounted on vertical shaft 132 which is an extension of the shaft of motor 134, Figure 13. Plate or strap 126 supports the upper end of shaft 132.

When motor 134 rotates 120° in the counterclockwise direction, Figure 12, a completed ice cream cone is transported from the cone loading station 152 to the ice cream cone dispensing station 154. Simultaneously, an empty cone is transported from the cone dispensing station 150 to the cone loading station 152.

When carriage 130 rotates 120°, as in a cone transporting movement, the assembly of tubes 110 is rotated one eighth of a revolution to bring a new tube 110 into alignment with the opening 124a in floor plate 124. This movement is accomplished by the gear train comprising gears 156, 158 and 160, Figure 12. The latter gear is mounted for rotation with bevel gear 162, Figure 13, and drives the shaft 120 through the planetary bevel gears 164.

Thus each time the carriage rotates in a 120° ice cream cone transporting movement, a new cone tube 110 is positioned over opening 124a and a new cone delivered.

The switch 166, Figure 12, is engaged by the arms 130d to stop motor 134 after 120° rotation of carriage 130.

The cycling mechanism

Operation of the ice cream cone dispenser of the present invention can best be understood from an explanation of the sequence of events following deposit of a coin in receptacle 40, Figure 1. This explanation will be made with reference to the circuit diagram of Figure 16 and the time chart of Figure 17.

When a coin is dropped in the receptacle 40, the switch 200, Figure 16, is momentarily closed to energize cup motor 78 from power line 202. This operation is achieved by well known mechanism (not shown) constituting part of the receptacle 40. This causes the cup 100 and the knife 84 to rotate in opposite directions and cut a ball of ice cream which drops down on the cone 40, Figure 5.

The rotation of motor 78 is continued after switch opens by the position switch 204. This switch is shown in Figure 3. It co-acts with the arm 92a formed unitarily with spur gear 92 to assume an open position when cup 100 is in the neutral position of Figure 9. Otherwise switch 204 is closed.

Thus, when the momentary closing of switch 200 rotates motor 78 beyond the dead zone of switch 204, the latter switch energizes the motor for continued rotations until a full rotation of cup 100 takes place.

The switch 200a constitutes a second set of poles on coin switch 200 and operates in unison therewith. Switch 200a is connected to energize cam motor 200 from lines 202.

The cam motor 200 may be any one of many types well known in the art. It rotates a shaft bearing cams which control cooperating cam switches to carry out the later steps in the sequence of operation. It also includes a cam switch 208 which is open in the neutral position and is closed at all other times so that when switch 200a is momentarily closed the cam motor 206 carries switch 208 over its dead zone and the latter switch thereafter energizes motor 206 for a full revolution.

A predetermined time after actuation, the cam motor 206 rotates to the point where motor 134 is actuated through the switch 210 which is a cam switch actuated by motor 206. Switch 210 is held closed momentarily and energizes motor 134 for the time necessary to carry carriage 130 beyond the dead zone of switch 166. Motor 134 thereafter is energized through switch 166 until 120° of rotation takes place, at which time switch 166 is again opened by engagement with an arm 130d.

Thus, when the coin is deposited, the dipper or cup 100 rotates to form and deposit an ice cream ball on the cone 40 and the carriage 130 rotates to move the completed ice cream cone to the ice cream cone delivery station 154 where it is accessible through door 26.

The remaining steps in the cycle of operations place the mechanism in readiness for the next sequence or cycle of operations.

A predetermined time after the cam motor 200 starts, the cam switch 212 is closed. The switch 212 thereby energizes the motor 66 through normally closed switches 68 and 103, thus causing the plunger 52 to descend and force ice cream into the dipper or cup 100. When the cup 100 is full and the carriage 76 has tilted in response to the ice cream pressure as shown in Figure 8, the switch 108 is opened and the downward movement of plunger 52 arrested.

A predetermined time after cam motor 200 is energized, the switch 214 is momentarily closed. This energizes motor 66 in the reverse direction through normally closed limit switch 67. The resulting rotations of motor 66 retract the plunger 42 a fixed distance and relieve the pressure on the ice cream.

The time selected for reverse operation of motor 66 is sufficiently late after initiation of operation of cam motor 200 to avoid any interference with the forward operation of motor 66.

The motor 66 may be arranged for reversing operation in accord with actuation of switches 212, and 214 by any one of several methods. One method utilizes the shunt type motor 66 with its field permanently connected to power line 202 in conjunction with double pole switches 212 and 214, as shown. When switch 212 is closed the polarity applied to motor 66 is such as to cause rotation in one direction whereas when switch 214 is closed the reverse polarity imparts opposite rotations to motor 66.

The switches 67 and 68 are limit switches preventing damage to the mechanism in the event the plunger 52 reaches the limit of its travel in one direction or the other without being stopped by other components of the unit.

From the foregoing description it will be evident that deposit of a coin, and the consequent momentary closing of switch 200, causes the mechanism to undergo a complete cycle of operation from making a complete ice cream cone and transporting it to the ice cream cone dispensing station to preparing the mechanism for another cycle of operations.

The cam motor 206, the cam switches, and other electrical control elements not mounted elsewhere are contained in a box 216 located behind cabinet 22 as shown in Figure 2.

Thumb screws 147 and 149, Figure 14, act as adjustable stop elements to control the degree cams 132 and 134 extend into the cone-receiving tubes 110.

While I have shown and described a specific embodiment of my invention it will be understood that alternative constructions may be made without departing from the true spirit and scope thereof. I therefore intend by the appended claims to cover all such modifications and alternative constructions as fall within the true spirit and scope of my invention.

What I claim as new and desire to secure by Letters Patent of the United States is:

1. In an apparatus for automatically forming and delivering balls of ice cream from a container the combination of an ice cream container having an opening in one end thereof, a substantially hemispherical cup for forming a ball of ice cream, carriage means for said cup including a horizontally disposed shaft pivoted intermediate its ends for rocking movement between normal horizontal position and tilted position, means mounting the cup on one end of said shaft with the cup portion in registry with the opening when in normal position, means for causing ice cream to extrude through said opening into said cup and cause tilting movement of said supporting shaft responsive to the forces of ice cream upon filling said cup, and switch means positioned operatively to be engaged by said shaft in response to movement of said shaft to tilted position for rendering said ice cream extruding means ineffective.

2. In an apparatus for automatically forming and delivering balls of ice cream from a container the combination of an ice cream container having an opening in one end thereof, a substantially hemispherical cup for forming a ball of ice cream, carriage means for said cup including a horizontally disposed shaft pivoted intermediate its ends for rocking movement between normal horizontal position and tilted position, means mounting the cup on one end of said shaft with the cup portion in registry with the opening when in normal position, means for causing ice cream to extrude through said opening into said cup and cause tilting movement of said supporting shaft responsive to the forces of ice cream upon filling said cup, switch means positioned operatively to be engaged by said shaft in response to movement of said shaft to tilted position for rendering said ice cream extruding means ineffective, and mechanism for rotating said cup-supporting shaft for inverting the cup and cutting the ice cream ball to be released therefrom.

3. In an apparatus for automatically forming and delivering balls of ice cream from a container, the combination of an ice cream container having an opening in one end thereof, a cup for forming a ball of ice cream, carriage means for said cup including a pair of concentric telescoping shafts horizontally disposed and pivoted intermediate their ends for rocking movement between their normal horizontally disposed position and tilted position, means mounting the cup onto one end of one of said shafts in alignment with the opening in the container for receiving ice cream upon extrusion therefrom, means for causing ice cream to extrude through said opening into said cup and causing tilting movement of said supporting shafts responsive to the forces imparted by the ice cream upon filling the cup, switch means positioned operatively to be engaged by said shaft upon rocking movement to tilted position for rendering said ice cream extruding means ineffective, a hemispherical cutting knife lying adjacent the inner wall of said cup and means operative subsequent to filling of said cup for rotating the shafts whereby the cup is inverted and the cutting knife is actuated across the inner wall thereof to sever the ball of ice cream for release from the cup.

4. In the method of automatically dispensing a frozen confection in increments of predetermined shape from bulk contained within a confining space, the steps of applying pressure onto the frozen confection within said confined space to cause the frozen confection to be extruded, partially shaping and yieldingly supporting the extruded confection, continuing the application of pressure for the extrusion of the frozen confection to displace the same by reason of being yieldingly supported, and releasing the pressure on the frozen confection in response to the displacement of the extruded partially shaped confection.

5. In the method of automatically dispensing a frozen confection in increments of predetermined shape from bulk contained within a confining space, the steps of applying pressure onto the frozen confection within said confined space to cause the frozen confection to be extruded, partially shaping and yieldingly supporting the extruded confection, continuing the application of pressure for the extrusion of the frozen confection to displace the same by reason of being yieldingly supported, releasing the pressure on the frozen confection in response to the displacement of the extruded partially shaped confection, finishing the shaping and separating said increment from said bulk.

6. In the method of automatically dispensing a frozen confection in increments of predetermined shape from bulk contained within a confining space, the steps of applying pressure onto the frozen confection within said confined space to cause the frozen confection to be extruded, partially shaping and yieldingly supporting the extruded confection, continuing the application of pressure for the extrusion of the frozen confection to displace the same by reason of being yieldingly supported, releasing the pressure on the frozen confection in response to the displacement of the extruded partially shaped confection, finishing the shaping and separating said increment from said bulk, dropping the shaped increment of confection separated from said bulk upon a receiver, and displacing the receiver from the increment receiving position to a delivery position.

(References on following page)

References Cited in the file of this patent

UNITED STATES PATENTS

| | | |
|---|---|---|
| 979,854 | Henuis | Dec. 27, 1910 |
| 1,197,211 | Kennedy | Sept. 5, 1916 |
| 1,289,907 | Proper | Dec. 31, 1918 |
| 1,412,727 | Walsh | Apr. 11, 1922 |
| 1,425,886 | Mai | Aug. 15, 1922 |
| 1,577,241 | Ajouelo et al. | Mar. 16, 1926 |
| 1,758,028 | Brown | May 13, 1930 |
| 1,774,708 | Gladish | Sept. 2, 1930 |
| 1,799,755 | Loughridge | Apr. 7, 1931 |
| 1,855,441 | Crouse | Apr. 26, 1932 |
| 1,959,327 | Adams | May 22, 1934 |
| 2,337,161 | Hessert | Dec. 21, 1943 |